Patented Aug. 17, 1948

2,447,459

UNITED STATES PATENT OFFICE 2,447,459

SOLUTIONS OF CELLULOSE TRIACETATE AND PROCESS OF PREPARING THE SAME

Keith Famulener, Owego, and Russell P. Easton, Binghamton, N. Y., assignors to General Aniline & Film Corporation, New York, N. Y., a corporation of Delaware No Drawing. Application June 21, 1945, Serial No. 600,828

4 Claims. (Cl. 106—189)

This invention relates to solutions of cellulose triacetate and particularly to a method of preparing solutions of cellulose triacetate containing from 61 to 62.5 per cent combined acetic acid.

As is well known, cellulose acetate is produced commercially in a number of grades which differ in their degree of acetylation. The term "cellulose triacetate" has been used very loosely in the past in defining a cellulose acetate without a fixed amount of combined acetic acid or the extent of esterification. Generally, however, this term includes cellulose triacetate having a combined acetic acid content greater than 58 per cent. In the ordinary process by which cellulose acetate is manufactured, it is first produced as a highly esterified material containing an acetic acid content of approximately 61 to 62.5 per cent and it is this form which is actually cellulose triacetate.

The highly esterified cellulose acetates (cellulose triacetate) have superior mechanical and water resistant properties as compared with partially hydrolyzed acetates. However, because of the poor solubility characteristics of cellulose triacetate, its use has been almost completely restricted to those applications where it can be heat formed, i. e., as a molding material where it remains permanently soft under heat and the mold must be cooled before the molded article is removed.

It is known that about 10 parts by weight of cellulose acetate with a combined acetic acid content of about 60 per cent is soluble in 45 parts by weight of a mixture of solvents such as methylene chloride with a lower aliphatic alcohol such as, for example, methyl alcohol or ethyl alcohol. Articles made from such solutions are, however, too brittle for many uses. In order to overcome this undesirable characteristic, it has been proposed to add acetone to such solutions in an amount below that at which the cellulose triacetate will precipitate from solution. The concentration of the cellulose acetate solution to which 45 per cent by weight of acetone has been added is reduced from 18.18 per cent to about 10 per cent. Solutions of cellulose acetate in concentrations greater than 10 per cent by weight in a mixture of solvents such as methylene chloride and ethyl alcohol are readily prepared, but are unsatisfactory for preparing sheets, since the sheets obtained are also brittle. Cellulose triacetate containing from 61 to 62.5 per cent of combined acetic acid is not appreciably soluble at room temperature in acetone nor in a methylene chloride-alcohol solution mixture.

It is also known that 10 per cent to about 20 per cent solutions of cellulose acetate can be prepared by swelling the cellulose triacetate with a solvent such as acetone, methyl ethyl ketone, ethyl or propyl formate, etc., freezing the swollen mixture at a temperature ranging from —45° to —70° C., and then stirring it until it reaches room temperature. This process, which is described in French Patent 785,036 and in United States Patent 2,362,182, is only effective, however, on cellulose acetate with a combined acetic acid content of 58–61 percent, but does not solubilize cellulose triacetate with a combined acetic acid content of 61–62.5 per cent. Cellulose acetate solutions obtained by this process are unstable and become turbid, and finally gel within three days. The most reasonable explanation of this solvency effect is quite similar to that advanced for mixed solvents where neither of the components are themselves solvents. In all probability acetone, as well as other ketones and esters, form association compounds with cellulose acetate at low temperatures, and these association compounds are soluble in an excess of the solvent and gradually break down with age causing the dope (solution) to gel.

It is an object of the present invention to provide stable solutions of cellulose triacetate containing from 61 to 62.5 per cent combined acetic acid.

Another object is to provide solutions of cellulose triacetate containing from 61 to 62.5 per cent combined acetic acid, which are not only clear, but stable and do not gel upon storage.

A further object is to provide an improved process for preparing said solutions.

Other objects and features of the present invention will become more apparent as the description proceeds.

The objects outlined above are accomplished by maintaining cellulose triacetate containing from 61 to 62.5 per cent combined acetic acid with a solvent mixture consisting of an alkyl poly-halide having a boiling point not lower than 40° C. with a normally liquid alcohol in the ratio of 80–95 to 20–5, but preferably in the ratio of 90–10, at a temperature ranging from about 0° C. to —75° C. for a time sufficient to swell or gel the cellulose triacetate and subsequently warming the gelled mixture to room temperature. The warmed mixture is then subjected to physical agitation so as to promote fluidity (solution) of the gelled dispersion. A preferred ratio of cellulose triacetate is from 1 to 20 parts by weight per 80 to 99 parts by weight of the solvent mixture. In these ratios swelling of the cellulose triacetate takes place readily at these temperatures.

The most essential feature of our invention resides in the use of a normally liquid alkyl polyhalide having a boiling point not lower than 40° C. as the principal solvent in a solvent mixture in the ratio of 80-95 parts by weight to 20-5 parts of weight of a normally liquid aliphatic, aromatic, or heterocyclic alcohol. By "normally liquid" is meant that the solvent is liquid at room temperature i. e., 20° C.

It has been pointed out above that in resorting to the prior art procedures for the purpose of producing solutions of cellulose triacetate, at room temperature, the solvents or mixture of solvents employed were not effective in dissolving the ester. It has been found, however, that these same solvents in the ratios given above were affective for cellulose triacetate i. e., 61 to 62.5 per cent cellulose acetate, when employed at a temperature ranging from 0° to -70° C. This finding led to the conclusion that the low temperature solubilization of cellulose triacetate depends upon a complex formation with the alcohol. This complex is either soluble in the alcohol, or requires the alkyl poly-halide to effect complete solubility.

As suitable examples of alkyl poly-halides having boiling points not lower than 40° C. may be mentioned methylene chloride, ethylene chloride, 1.1 - dichloroethane, 1.1.2 - trichloroethane, 1.1.1-trichloroethane, and the like.

Suitable alcohols are, for example, methyl alcohol, ethyl alcohol, propyl alcohol, isopropyl alcohol, n-butyl alcohol, tert.-butyl alcohol, isobutyl alcohol, benzyl alcohol, 2-methyl-benzyl alcohol, 3 - methyl-benzyl alcohol, 4 - methylbenzyl alcohol, furfuryl alcohol, tetrahydrofurfuryl alcohol, and the like.

Suitable ketones are, for example, acetone, ethyl methyl ketone, diethyl ketone, methyl propyl ketone, isopropyl methyl ketone, tert.-butyl methyl ketone, acetonyl acetone, acetylacetone, cyclobutanone, cyclopentanone, acetophenone, ethyl phenyl ketone, benzyl methyl ketone, benzyl phenyl ketone, and the like.

As suitable esters may be mentioned methyl acetate, ethyl acetate, propyl acetate, acetoacetic methyl ester, acetoacetic ethyl ester, methyl formate, ethyl formate, propyl formate, methyl and ethyl benzoate, methyl salicylate, and the like.

In practicing the present invention cellulose triacetate, having an acetic acid content of 61 to 62.5 per cent, is added in a ratio of 5 to 20 parts by weight to approximately 75 to 95 parts by weight of a solvent mixture consisting of 80-95 parts by weight of an alkyl poly-halide having a boiling point not lower than 40 C. and 5-20 parts by weight of the alcohol, into a vessel provided with a mechanical stirrer. The resulting mixture is maintained at a temperature below 0° C. for a period of time sufficient to permit the swelling of the cellulose triacetate by the solvent mixture. In general, swelling of the cellulose triacetate by the solvent mixture occurs at about 0° C. and is accelerated with a decrease in temperature. A temperature between —50° and —75° C. is preferred since swelling of the cellulose triacetate by the solvent mixture takes place more rapidly and completely. Solid carbon dioxide alone, or suspended in acetone or alcohol may be employed as the refrigerant. When sufficient swelling of the cellulose triacetate is obtained, the swollen gel is warmed to room temperature and thereafter stirred until it becomes a fluid solution.

Where flexibility of the cellulose triacetate formed by the evaporation of the solvent mixture is desired, plasticizers may be added directly into the solvent mixture prior to low temperature swelling, during the warming operation of the swollen gel to room temperature, or to the final fluid product. The ratio of the plasticizers employed may vary from 5 to 50 per cent by weight of the cellulose triacetate. As examples of suitable plasticizers may be mentioned triphenyl phosphate, trioctyl phosphate, dimethyl phthalate, dibutyl phthalate, diethyl phthalate, and the like.

*Example I*

A solvent mixture consisting of 8.2 parts by weight of methyl alcohol and 73.8 parts by weight of methylene chloride was added to a mixture of 15.7 parts of weight of cellulose triacetate having a combined acetic acid content of 62.3 per cent and 2.3 parts of triphenyl phosphate. This mixture was maintained at a temperature of —75° C. for 4 hours. The resulting swollen gel dispersion was allowed to reach room temperature and when sufficiently softened was stirred until it became fluid.

*Example II*

10 parts by weight of cellulose triacetate having a combined acetic acid content of 61 per cent was added to 90 parts of weight of the solvent mixture consisting of 81 parts of 1,1,2-trichloroethane and 9 parts of benzyl alcohol. The solvent mixture swelled the cellulose triacetate and after 4 hours at —65° C. a swollen gel formed, which, upon warming to room temperature, became fluid.

While the present invention has been described in considerable detail with reference to preferred procedures, materials, and uses, it is to be understood that the invention is not limited thereto and that numerous variations may be made in the procedure herein described. Equivalent materials may be substituted, as for example, a mixture of any one of the solvents described above as solubilizing agents for the highly esterified cellulose triacetate may be employed. All such modifications and variations are within the scope of the invention as defined by the appended claims.

We claim:

1. In a process of preparing a solution of cellulose triacetate having a combined acetic acid content of 61 to 62.5 per cent the improvement which comprises swelling said cellulose triacetate in a solvent mixture consisting of a normally liquid alkyl polyhalide having a boiling point not lower than 40° C. and a normally liquid alcohol, in the ratio ranging from 80–95 to 20–5, respectively, at a temperature ranging from 0° to —75° C., and subsequently raising the temperature of the swollen mixture to room temperature to form a fluid solution.

2. In a process of preparing a solution of cellulose triacetate having a combined acetic acid content of 61 to 62.5 per cent, the improvement which comprises swelling said cellulose triacetate in a solvent mixture consisting of methylene chloride and methanol in the ratio of 9 to 1, respectively, at a temperature ranging from 0° to —75° C., and subsequently raising the temperature of the swollen mixture to room temperature to form a fluid solution.

3. A fluid solution of cellulose triacetate having a combined acetic acid content of 61 to 62.5 per cent capable of being cast to form flexible films and obtained according to the method of claim 1.

4. A fluid solution of cellulose triacetate having a combined acetic acid content of 61 to 62.5 per cent capable of being cast to form flexible films and obtained according to the method of claim 2.

KEITH FAMULENER.
RUSSELL P. EASTON.

REFERENCES CITED

The following references are of record in the file of this patent:

UNITED STATES PATENTS

| Number | Name | Date |
|---|---|---|
| 1,880,513 | Staud et al. | Oct. 4, 1932 |
| 2,362,182 | Baker | Nov. 7, 1944 |

OTHER REFERENCES

"Hercules Cellulose Acetate," Hercules Powder Company, Wilmington, Delaware (1941), pages 8, 9 and 10.